INVENTORS.
SERGIUS VERNET
AND ALLAN C. HOFFMAN,
BY

ATTORNEYS.

United States Patent Office 2,857,107
Patented Oct. 21, 1958

2,857,107
THERMOSTAT SYSTEM

Sergius Vernet and Allan C. Hoffman, Yellow Springs, Ohio, assignors to Vernay Laboratories Inc., Yellow Springs, Ohio, a corporation of Ohio Application December 17, 1953, Serial No. 398,709

4 Claims. (Cl. 237—8)

This invention relates to a thermostat and a thermostat system and more particularly to a thermostat and system useful in connection with the control of hot water heating systems for automobiles. As pointed out in the copending application of Allan C. Hoffman, Serial No. 87,220, filed April 13, 1949, now United States Patent No. 2,634,057, dated April 7, 1953, a study of the relationship between outside air temperature, ram air temperature, water temperature in and out of the heater, air temperature in and out of the heater and car temperatures in connection with speeds of travel have shown that changes in water flow and air flow and water and air temperatures were of considerable magnitude during normal driving operations. It was found that while both air flow and water flow increase as the car speed increases the proportionate relationship from the heat balance standpoint does not hold throughout the normal driving speed of an automobile.

Further, according to the disclosure of the said copending application, best results have been obtained when the temperature of the passenger compartment is controlled by controlling the flow of water through the heater. Preferably this is done by actuating the water valve in response to changes in the temperature of water coming from the heater.

There are however other temperatures which, as pointed out above, are important in controlling the temperature of the passenger compartment. In the first place, the temperature of the ambient air in the compartment to which the passengers are subjected must be considered. Secondly, it is important to consider the temperature of the hot air issuing from the heater. It is important also to determine the temperature of the outside air entering the heater, and it is also important in many cases to determine the temperature of the water returning from the heater core to the engine radiator.

In our copending application, Serial No. 156,780, filed April 19, 1950, now United States Patent No. 2,673,038, dated March 23, 1954, of which the present application is a continuation-in-part, we disclose a sealed system charged with a liquid which changes in volume in response to changes in temperature and which will maintain a fairly constant viscosity over a temperature range from about —40° F. to about +212° F. The sealed system is provided with a cylinder having a piston therein which piston is thus actuated in response to volume changes of the liquid in the system and which piston is operatively connected to a valve in the water circuit. A manual control is provided by the addition of another cylinder and piston in which the piston is manually settable to change the operating range of the first piston. The system includes a substantial length of capillary tubing which tubing may be disposed in various locations to obtain an integrated sensing for the actuation of the valve. Thus it is possible with the above described device to obtain sensings to control the valve from the ambient temperature in the passenger compartment, the temperature of the air issuing from the heater, the temperature of the air entering the heater, the temperature of the water returning from the heater core to the engine radiator or from any one or a combination of these locations.

In said copending case there were disclosed specifically arrangements for sensing the ambient air in the passenger compartment with a manual control in the passenger compartment and the sensing of the air passing out of the heater and the water passing out of the heater. In another embodiment we disclosed specifically the sensing of the ambient air subject, as above, to manual control and the sensing of air passing out of the heater. In a third embodiment we disclosed the sensing of the ambient air again subject to manual control and the sensing of the air passing out of the heater and the air passing into the heater. We intend, in the present application, to disclose an additional embodiment and to claim the additional embodiment and one of the embodiments heretofore disclosed specifically. Our claims in the parent case having been restricted by requirement for election of species, certain of the claims in the present application are, therefore, divisional with respect to the parent case.

It is the principal object of the present invention to provide a thermostat system wherein the ambient air in the passenger compartment is sensed and wherein a manual control is provided in the passenger compartment and wherein the temperature of the water passing out of the heater is sensed and wherein the temperature of the air flowing through the heater is also sensed. More specifically and as species of the above generic object, it is an object of the present invention to provide an arrangement wherein the air flowing through the heater is sensed before it enters the heater and in another embodiment where the air flowing through the heater is sensed as it passes out of the heater.

These and other objects of the invention which will become clear to those skilled in the art, upon reading these specifications, or which will be explained in greater detail hereinafter, we accomplish by that certain construction and arrangement of parts of which we shall now describe two exemplary embodiments.

Reference is made to the drawings forming a part hereof and in which.

The thermostatic elements and the manual control elements are identical to those disclosed in the said parent application, Patent No. 2,673,038, to which reference is made for a detailed description and understanding of these parts. The elements of the system, as before, comprise a sealing system charged with a liquid, as above outlined, and having a cylinder with a piston therein, which piston is thus actuated in response to volume changes of the liquid in the system and which piston is operatively connected to a valve in the water circuit.

The ambient air in the passenger compartment is sensed by another thermostatic element involving a cylinder and piston wherein the piston is manually settable to change the operating range of the first piston.

As before, the system includes a substantial length of capillary tubing which may be disposed variously in order to obtain an integrated sensing for the actuation of the valve.

Figure 1:
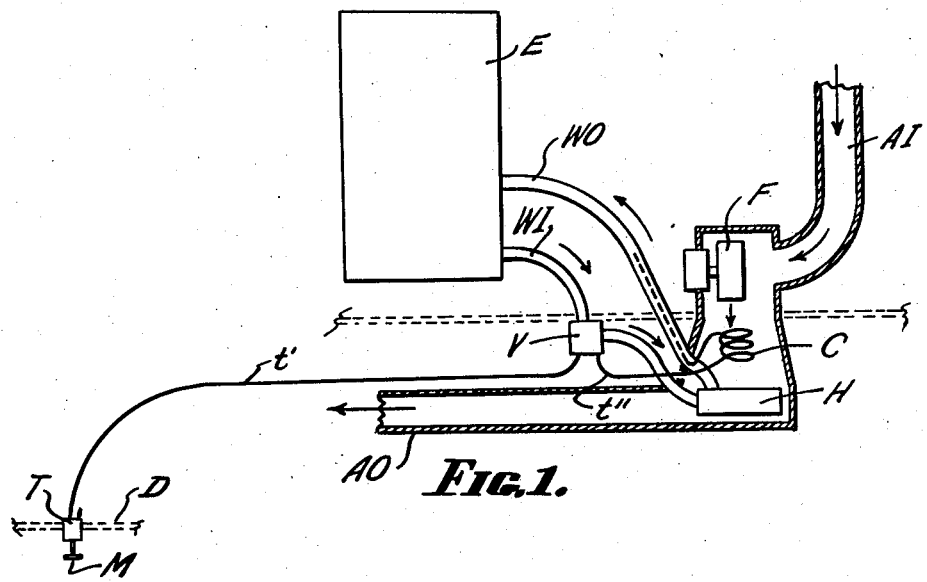
Figure 1 is a diagram showing one embodiment of our system.

Referring now more particularly to Figure 1, the automobile engine is indicated at E and the heater core is indicated at H. The water connections between the engine and the heater are indicated by WI and WO. The water flows from the engine into the heater through the line WI and flows from the heater core back to the engine through the line WO. The thermostatically actuated valve is indicated at V and is shown as being in the line WI.

This valve V is actuated by the piston of the first thermostatic element above described.

The heater H is fed by outside air passing in through a duct AI and the flow of air past the heater may be enhanced by means of a fan or blower F. The air passes from the heater to the passenger compartment through a duct AO. The dashboard of the automobile is indicated schematically at D and another thermostatic element including the manual settable piston is indicated at T.

The capillary tubing connecting the two pistons above described is indicated at $t'$ and the additional lengths of capillary tubing referred to is indicated at $t''$. It will be observed that the tubing $t''$ passes into the duct through which the air passes into the heater between the fan and the heater core where it may be disposed in the form of a coil C and the end of the line $t''$ then passes into the line WO as shown in broken lines.

It will now be clear that the portion of the capillary tubing in the line WO gives a sensing of the temperature of water leaving the heater, while a portion of the line $t''$, indicated at C, gives a sensing of the temperature of the air before it reaches the heater. The thermostat T is sensing the ambient air in the passenger compartment and a manual control for the system is provided at M.

Figure 2:
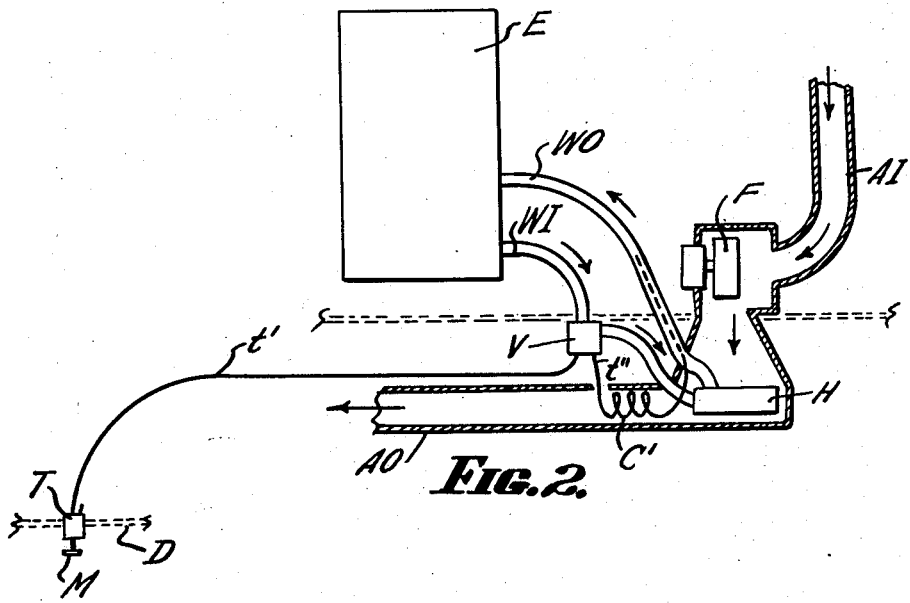
Figure 2 is a diagram similar to Figure 1 showing another embodiment of our system.

In Figure 2, wherein the same reference characters are used to designate the same parts, the only difference is that the capillary tubing $t''$ has its portion C' disposed within the duct AO to sense the temperature of air leaving the heater.

The operation of the system of Figure 2 is the same as that of Figure 1 with the exception that the integrated sensing subject to manual control is made up of the temperature of the water leaving the heater, the air leaving the heater and the ambient temperature in the passenger compartment rather than, as in Figure 1, the temperature of the water leaving the heater, the temperature of the air entering the heater and the ambient temperature in the passenger compartment.

Various modifications in detail will suggest themselves to those skilled in the art and we therefore do not intend to limit ourselves to specific details of the embodiments shown.

Having now fully described our invention, what we claim as new and desire to secure by Letters Patent is:

1. In an automobile having a hot water heating system wherein engine radiator water is circuited through a heater core, and wherein outside air is blown past said heater core and into the passenger compartment of said automobile, there being a valve in said water circuit, a thermostat system comprising a chamber associated with the dashboard of said automobile and a chamber associated with said valve, each of said chambers including a cylinder and a piston therein, the piston of the chamber associated with the dashboard being manually settable in relation to its cylinder, and the piston of the chamber associated with the valve being operatively connected to said valve, each of said chambers constituting a thermostat, said thermostat associated with said valve sensing hot water temperature and said thermostat associated with said dashboard sensing car temperature, capillary tubing connected to said chambers, said chambers and tubing being charged with a liquid which changes in volume in response to changes in temperature, said capillary tubing being of substantial length, a portion of said tubing being disposed to sense the temperature of the water flowing out of said heater, and a portion of said tubing being disposed to sense the temperature of air flowing through said heater.

2. A thermostat system according to claim 1 wherein a portion of said tubing is disposed to sense the temperature of the air entering said heater.

3. A thermostat system according to claim 1 wherein a portion of said tubing is disposed to sense the temperature of the air leaving said heater.

4. A thermostat system according to claim 1 wherein the tubing connected to said chambers comprises a length of tubing connecting said chambers together, and an additional length of tubing connected to one of said chambers at one end and sealed at its other end, said additional length of tubing being disposed to sense the temperature of water leaving said heater core.

References Cited in the file of this patent

UNITED STATES PATENTS

| | | |
|---|---|---|
| 1,806,393 | Giesler | May 19, 1931 |
| 2,235,692 | Timmis | Mar. 18, 1941 |
| 2,298,163 | Raney | Oct. 6, 1942 |
| 2,490,919 | Raney | Dec. 13, 1949 |
| 2,673,038 | Vernet et al. | Mar. 23, 1954 |